(12) United States Patent
Cosby et al.

(10) Patent No.: US 10,060,266 B2
(45) Date of Patent: Aug. 28, 2018

(54) COVERS FOR CAVITIES IN AIRCRAFT FAN BLADES

(71) Applicant: UNITED TECHNOLOGIES CORPORATION, Farmington, CT (US)

(72) Inventors: James Cosby, Glastonbury, CT (US); Michael A. Weisse, Tolland, CT (US); Kwan Hui, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 433 days.

(21) Appl. No.: 14/768,512

(22) PCT Filed: Nov. 8, 2013

(86) PCT No.: PCT/US2013/069069
§ 371 (c)(1),
(2) Date: Aug. 18, 2015

(87) PCT Pub. No.: WO2014/137415
PCT Pub. Date: Sep. 12, 2014

(65) Prior Publication Data
US 2015/0377031 A1    Dec. 31, 2015

Related U.S. Application Data

(60) Provisional application No. 61/775,217, filed on Mar. 8, 2013.

(51) Int. Cl.
*F01D 5/18* (2006.01)
*F01D 5/14* (2006.01)
(Continued)

(52) U.S. Cl.
CPC ............. *F01D 5/18* (2013.01); *B23P 15/04* (2013.01); *F01D 5/147* (2013.01); *F04D 29/324* (2013.01);
(Continued)

(58) Field of Classification Search
CPC .......... F01D 5/18; F01D 5/147; F04D 29/324; F05D 2230/23; F05D 2230/60;
(Continued)

(56) References Cited

U.S. PATENT DOCUMENTS 5,725,355 A    3/1998  Crall et al.
7,189,064 B2   3/2007  Helder et al.
(Continued)

FOREIGN PATENT DOCUMENTS

EP        2589461 A1      5/2013
WO   20140312203 A2      2/2014
(Continued)

OTHER PUBLICATIONS

European Search Report for Application No. EP13877424.
International Search Report Application No. PCT/US2013/069069; dated Aug. 12, 2014.

*Primary Examiner* — Mark Laurenzi
*Assistant Examiner* — Xiaoting Hu
(74) *Attorney, Agent, or Firm* — Cantor Colburn LLP

(57) ABSTRACT

Hollow fan blades for gas turbine engines are disclosed. The hollow fan blades include a body having a convex side and a concave side wherein the convex side has a cavity formed therein. The cavity is covered by two covers including an inner cover that may be adhered to the body of the fan blade assembly and an outer cover that may be adhered to the inner cover and/or the body of the fan blade assembly. The covers may be made of titanium, more than two covers may be employed and more than one cavity may be employed.

19 Claims, 3 Drawing Sheets

(51) Int. Cl.
*B23P 15/04* (2006.01)
*F04D 29/32* (2006.01)

(52) U.S. Cl.
CPC ...... *F05D 2220/32* (2013.01); *F05D 2220/36* (2013.01); *F05D 2230/23* (2013.01); *F05D 2230/60* (2013.01); *Y02T 50/671* (2013.01); *Y02T 50/676* (2013.01)

(58) Field of Classification Search
CPC ............. F05D 2220/32; F05D 2220/36; Y02T 50/671; Y02T 50/676; B23P 15/04
See application file for complete search history.

(56) References Cited

U.S. PATENT DOCUMENTS

| | | | | |
|---|---|---|---|---|
| 2005/0254955 | A1* | 11/2005 | Helder | B23K 20/122 |
| | | | | 416/233 |
| 2006/0039792 | A1* | 2/2006 | Ferte | B23K 20/122 |
| | | | | 416/232 |
| 2010/0209235 | A1 | 8/2010 | Shim et al. | |
| 2010/0266415 | A1 | 10/2010 | Viens et al. | |
| 2011/0211965 | A1* | 9/2011 | Deal | F01D 5/147 |
| | | | | 416/223 R |
| 2011/0268562 | A1* | 11/2011 | Knight, III | F01D 5/18 |
| | | | | 415/179 |
| 2013/0108470 | A1* | 5/2013 | Weisse | F01D 5/147 |
| | | | | 416/97 R |
| 2013/0319010 | A1* | 12/2013 | Hui | F01D 5/141 |
| | | | | 60/805 |
| 2014/0072427 | A1* | 3/2014 | Weisse | F01D 5/147 |
| | | | | 415/220 |
| 2014/0170435 | A1* | 6/2014 | Hui | F01D 5/147 |
| | | | | 428/613 |

FOREIGN PATENT DOCUMENTS

| | | |
|---|---|---|
| WO | 2014042975 A1 | 3/2014 |
| WO | 2014099366 A1 | 6/2014 |

* cited by examiner

COVERS FOR CAVITIES IN AIRCRAFT FAN BLADES

CROSS-REFERENCE TO RELATED APPLICATION

This Application is a US National Stage under 35 USC § 371 of International Patent Application No. PCT/US2013/069069 filed on Nov. 8, 2013 claiming priority under 35 U.S.C. § 119(e) to U.S. Provisional Patent Application Ser. No. 61/775,217 filed on Mar. 8, 2013.

TECHNICAL FIELD

This disclosure relates to fan blades for aircraft engines, such as gas turbine engines. More specifically, this disclosure relates to such fan blades with hollow cavities disposed therein to make the fan blades lighter and improved covers for the cavities that are easier to manufacture and with a reduced risk of the covers becoming detached from the fan blades during use.

BACKGROUND

A gas turbine engine, such as a turbo fan engine for an aircraft, includes a fan section, a compression section, a combustion section and a turbine section. An axis of the engine is centrally disposed within the engine and extends longitudinally through these sections. The primary flow path extends axially through the sections of the engine. A secondary flow path for extends parallel to and radially outward of the primary flow path.

The fan section includes a rotor connected to a plurality of radially extending fan blades. The fan blades extend through the flow path and interact with the air and transfer energy between the fan blades and the air. A fan case acts as a stator and circumscribes the rotor and fan blades in close proximity to the tips of the fan blades.

During operation, the fan draws the air into the engine. The fan also raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressor section. Energy from the products of combustion not needed to drive the fan and compressor contributes useful thrust.

In order to reduce weight, the fan blades in some gas turbine engines are hollow. According to US 2007/0128042, each fan blade may be made by combining two separate halves. Each half may include a plurality of cavities and ribs machined out to reduce the weight while forming a structurally sound internal configuration. One half forms the pressure side wall and the other half forms the suction side wall. When the halves are joined, the pressure side wall and the suction side wall are separated and supported by the ribs to form a hollow fan blade. The hollow fan blade is then subjected to forming operations at extremely high temperatures at which time it is given an airfoil shape and geometry. The side walls may be contoured and curved to form an airfoil.

Hollow and therefore lighter fan blades improve thrust-specific fuel consumption (TSFC). Another way to lighten a fan blade is to hollow out cavities in a solid structure and adhere on a cover. For a titanium fan blade, one option is a titanium cover. However, titanium covers are hard to form due to their stiffness. Even with hot forming, the thickness of the cover that can be formed is limited. Since the thickness of the cover sets the wall thickness for much of the side the cover is on, that compromises the stiffness of the blade and a thin cover is more likely to buckle under bird impact. Another problem with a thicker cover is that it is also hard to make it conform or be flush to the blade to eliminate or reduce low dams and waterfalls, that result from variations in the surfaces of blade body and cover. Dams and waterfalls can be eliminated by sanding epoxy around the outer perimeter of the cover, but a cover that generates dams and waterfalls will increase the time needed to sand the epoxy and may result in a shape different from the design intent. Thus, a more conformable cover that generates lower dams and waterfalls is needed.

Another potential problem with a cover is that the glue area may be insufficient to hold on to the cover under all conditions. With variation between suppliers and operators in bond preparation during manufacture, increasing the glue area for the cover will help mitigate the risk that a cover that did not undergo an ideal bond preparation procedure will still stay on under all conditions.

SUMMARY

In one aspect, a hollow fan blade is disclosed. The fan blade may include a body having a convex side and a concave side. A convex side may have a cavity formed therein that is defined by a back wall surrounded by a continuous sidewall. The fan blade may also include an inner cover overlays the cavity and is spaced apart from the back wall. The inner cover may be adhered to the body. The fan blade may also include an outer cover that at least partially overlays and abuttingly engages the inner cover and that is adhered to at least one of the body or inner cover.

In another aspect, a hollow fan blade is disclosed that may include a body having a convex side and a concave side. The convex side may have a cavity formed therein that is defined by a back wall surrounded by a cavity sidewall. The cavity sidewall may be surrounded by a recess. The fan blade may also include an inner cover that is mateably received in the recess and spaced apart from the back wall. The recess may be surrounded by a recess sidewall. The inner cover may be adhered to the recess. The fan blade may also include an outer cover that is also mateably received in the recess and that abuttingly engages the inner cover and includes a continuous side edge that is adhered to the recess sidewall.

In yet another aspect, a hollow fan blade is disclosed that may include a body having a convex side and a concave side. The convex side may have a cavity formed therein that is also defined by a back wall surrounded by a continuous sidewall. The convex side of the body may also include a continuous channel that is disposed outside of the cavity and that surrounds the sidewall of the cavity. The fan blade may also include an inner cover that at least partially overlays the cavity and is spaced apart from the back wall. The inner cover may include a continuous side edge that is adhered to the body. The inner cover may also include a continuous straddle disposed inside of the continuous side edge of the inner cover. The straddle may be received in and adhered to the channel of the body. Further, the fan blade may also include an outer cover that at least partially overlays and abuttingly engages the inner cover and may be adhered to the inner cover.

In any one or more of the embodiments described above, the side edge of the cavity may be surrounded by a recess that mateably receives the inner cover and that is adhered to the inner cover.

In any one or more of the embodiments described above, the recess may be surrounded by a recess sidewall and the outer cover is adhered to the recess sidewall.

In any one or more of the embodiments described above, the outer cover has a concave side and the inner cover has a convex side that is adhered to the concave side of the outer cover.

In any one or more of the embodiments described above, the inner and outer cover are adhered to the body with at least one epoxy.

In any one or more of the embodiments described above, the outer cover may include a convex side that is at least substantially flush with the convex side of the body of the fan blade.

In any one or more of the embodiments described above, the fan blade may include a third outermost cover that is mateably received within the recess and that abuttingly engages the outer cover. In such an embodiment, the third outermost cover may be adhered to at least one of the outer cover or the recess sidewall. In such an embodiment, the third outermost cover may also include a convex side that is at least substantially flush with the convex side of the body.

In any one or more of the embodiments described above, the convex side of the body may include a continuous channel disposed outside of the cavity and that surrounds the sidewall. The inner cover may include a continuous straddle disposed inside of the continuous side edge of the inner cover. The straddle may be received in and adhered to the channel of the body. In such an embodiment, the inner cover may further include a concave side and a convex side. The straddle may extend from the concave side of the inner cover towards the channel of the body and the convex side of the inner cover may include a continuous groove in registry with the straddle. In such an embodiment, the outer cover may be adhered to the convex side of the inner cover. Further, in such an embodiment, the groove of the convex side of the inner cover may include adhesive for further adhering the outer cover to the inner cover. Still further, in such an embodiment, the inner cover may include a continuous side edge and the body may include a recess that surrounds the channel. The continuous side edge of the outer cover may be received in and adhered to the recess in the body.

In any one or more of the embodiments described above, the groove of the convex side of the inner cover may include adhesive for further adhering the outer cover to the inner cover.

DESCRIPTION

Figure 1:
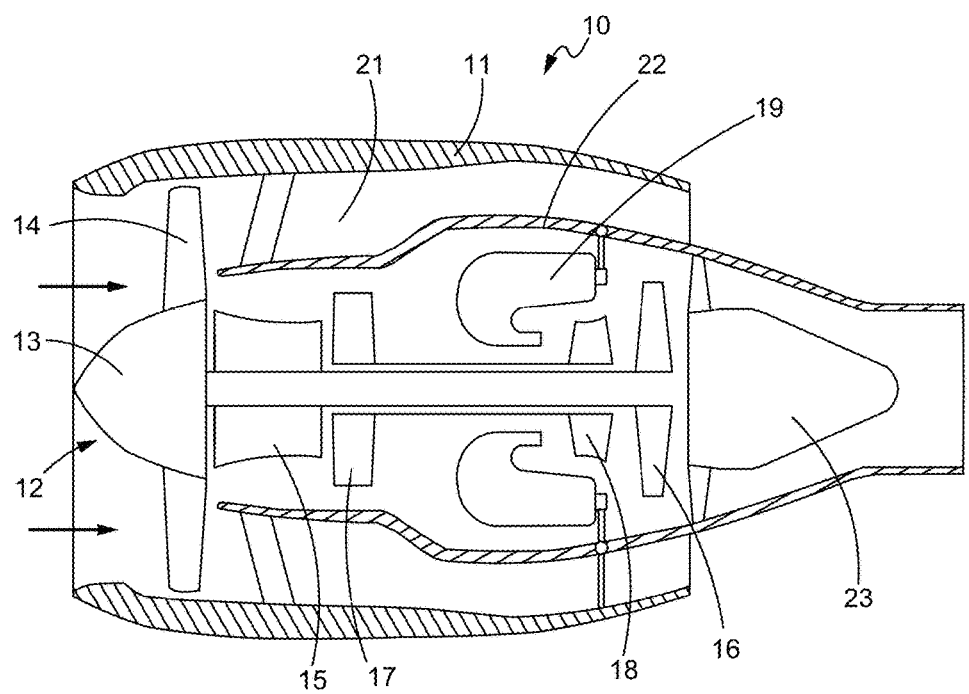
FIG. 1 is a perspective and sectional view of a turbofan gas turbine engine.

FIG. 1 is a sectional and perspective view of a turbofan jet engine 10 that includes a nacelle 11 that serves as an outer case for much of the engine and directs air towards the fan 12. The fan 12 includes a rotor 13 that is coupled to a plurality of fan blades 14. The engine 10 includes two spools including an inner spool and an outer spool, neither of which can be seen in FIG. 1. However, the fan 12 and the low pressure compressor (LPC) 15 are coupled to the low pressure turbine (LPT) 16 by an inner drive shaft that passes axially through an outer drive shaft that connects the high pressure compressor (HPC) 17 to the high pressure turbine (HPT) 18.

The fan 12 draws air into the nacelle 11 and through the low pressure compressor 15 as well as through the bypass duct 21 disposed between the nacelle 11 and the inner case 22. While not passing through the compressors 15, 17 or turbines 18, 16, air passing through the bypass duct 21 as a result of the action of the fan 12 does provide some thrust for the engine 10. However, the primary air flow proceeds from the fan 12 through the LPC 15 where the air is compressed before it passes through the HPC 17 where the air is further compressed before it enters the combustor 19 where the compressed air is mixed and burned with fuel. The combustion byproducts continue to proceed through the inner case 22 and rotate the HPT 18 and LPT 16 before exiting through the exit nozzle 23.

Figure 2:
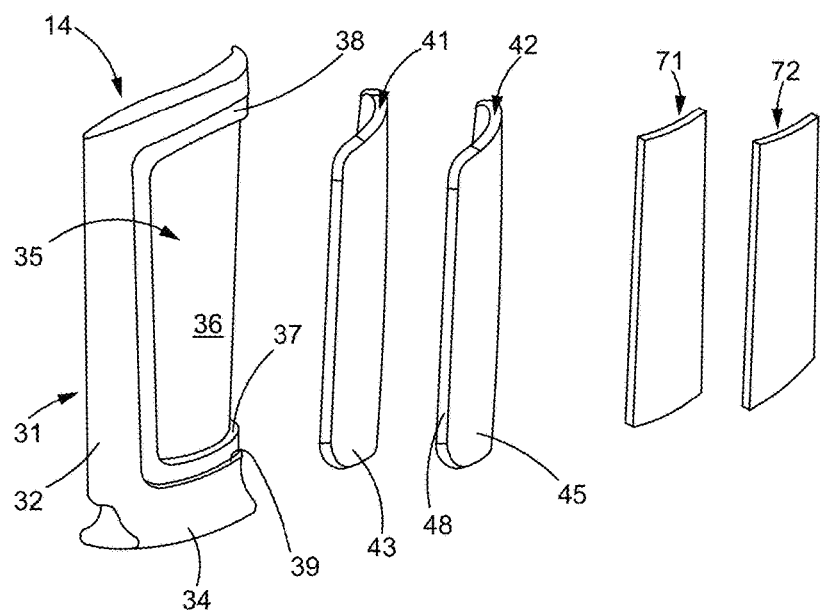
FIG. 2 is a perspective and exploded view of a fan blade with a cavity disposed therein and two covers for the cavity for purposes of forming a hollow fan blade.
Figure 3:
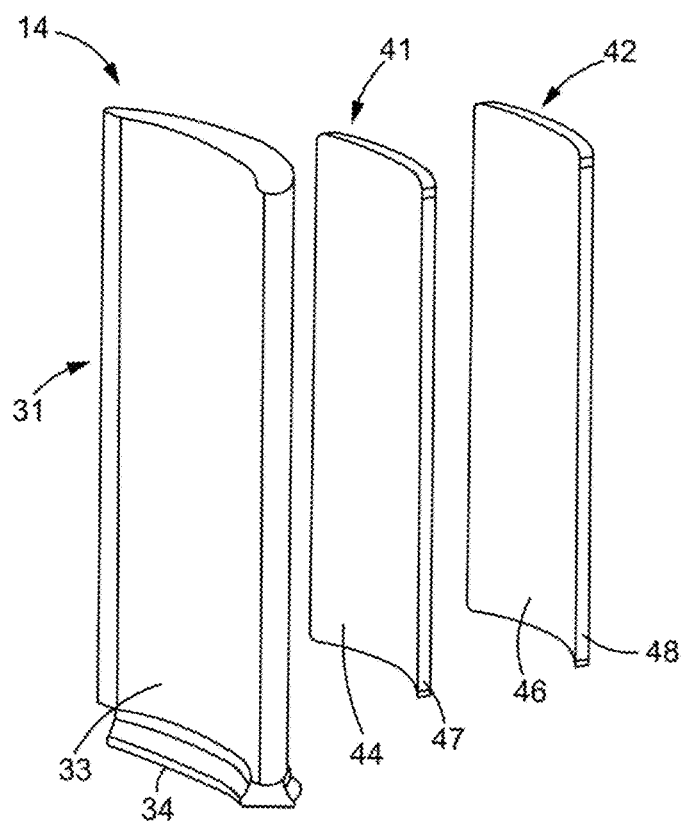
FIG. 3 is a rear perspective and exploded view of the fan blade shown in FIG. 2.

As noted above, the purposes of saving weight and improving TSFC, a hollow fan blade assembly 14 is shown in FIG. 2. The fan blade assembly 14 may include a body 31 having a convex side 32 and a concave side 33 (see FIG. 3). The body 31 may also include a root 34 for coupling the fan blade assembly 14 to the rotor 13. The convex side 32 of the fan blade assembly 14 may include a cavity 35 defined by a back wall 36 that may be surrounded by a cavity sidewall 37. The cavity sidewall 37 may be surrounded by a recess 38, which, in turn, may be surrounded by a recess sidewall 39. To cover the cavity 35 for purposes of forming a hollow fan blade assembly 14, a pair of covers including an inner cover 41 and an outer cover 42 are provided. An inner cover 41 also includes a convex side 43 and a concave side 44 (FIG. 3) while the outer cover 42 similarly includes a convex side 45 and a concave side 46 (FIG. 3). Each of the inner and outer covers 41, 42 include continuous side edges 47, 48 respectfully.

To close the cavity 35 and form the hollow fan blade assembly 14, epoxy or other suitable adhesive may be used to adhere the periphery of the inner cover 41 to the recess 38 and/or the recess sidewall 39. Similarly, epoxy or adhesive can be used to adhere the periphery of the outer cover 42 to the recess sidewall 39 as well. In addition, adhesive may be applied to the convex surface 43 of the inner cover 41 or to the concave side 46 of the outer cover 42 to secure the outer cover 42 to the inner cover 41 and/or the sidewall 39. Excess adhesive that may be squeezed through a seam defined by the side edge 48 of the outer cover and the recess sidewall 39 may be sanded to provide a smooth finish and ensure that the convex side 45 of the outer cover 42 is flush with the convex side 32 of the body 31.

Figure 4:
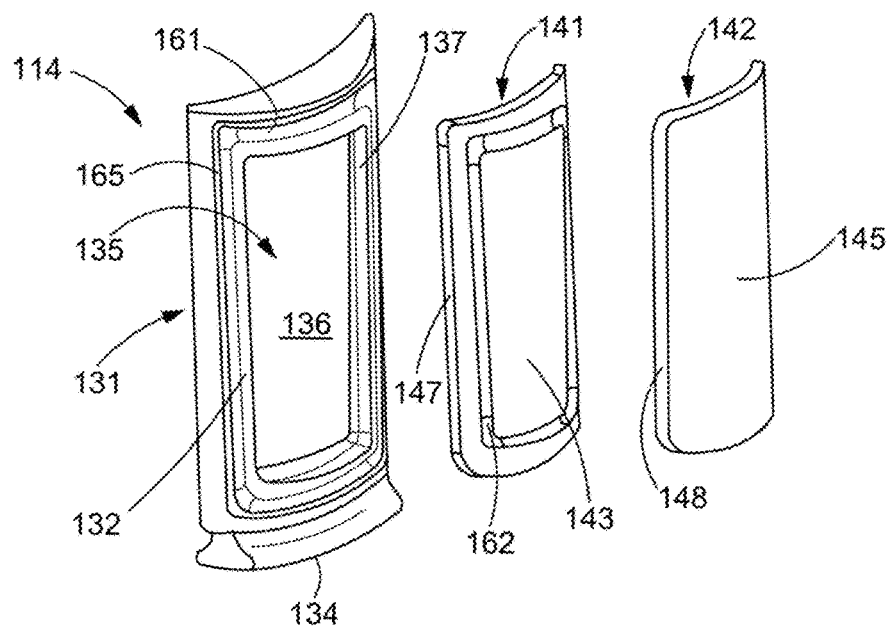
FIG. 4 is a perspective and exploded view of yet another fan blade with a cavity formed therein and two covers for the cavity for purposes of forming a hollow fan blade.
Figure 5:
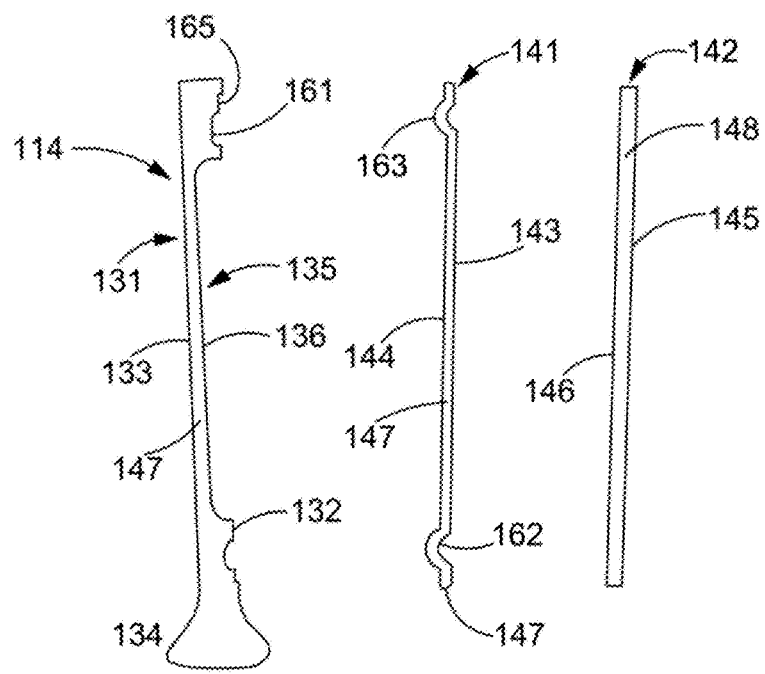
FIG. 5 is a sectional view of the fan blade body, inner cover and outer cover shown in FIG. 4.
Figure 6:
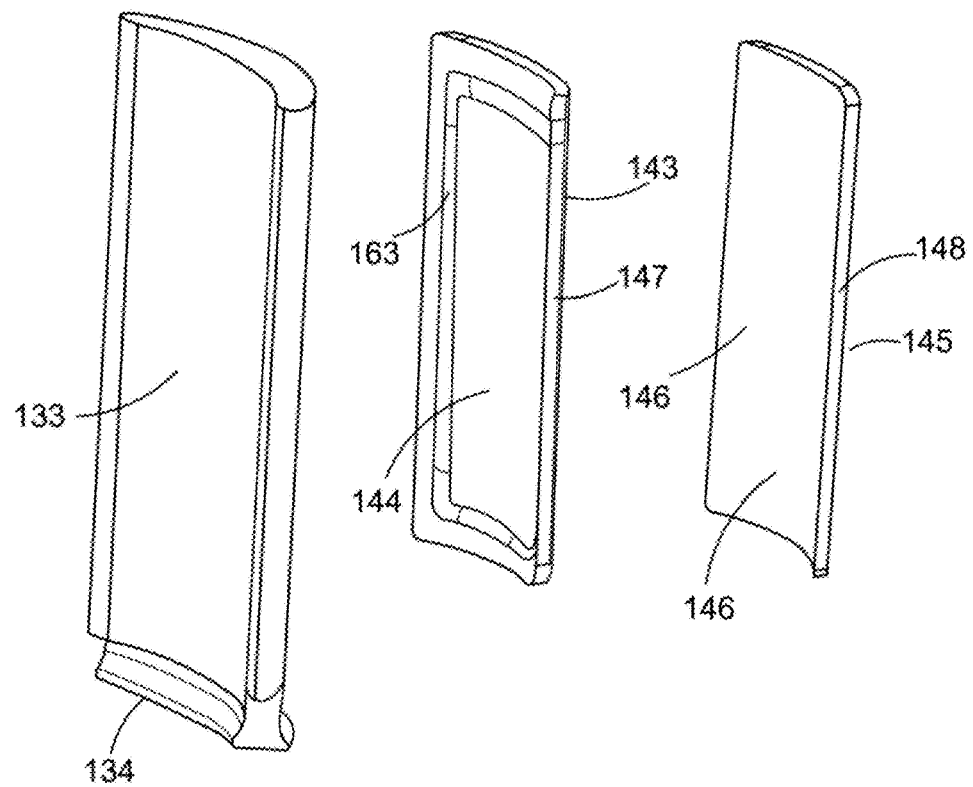
FIG. 6 is a rear perspective and exploded view of the fan blade components shown in FIGS. 4-5.

Another hollow fan blade assembly 114 is shown in FIGS. 4-6. Turning first to FIG. 4, the fan blade assembly 114 may include a body 131 with a convex side 132 and a concave side 133 (FIG. 6). The convex side 132 may include a cavity 135 defined by a back wall 136 and a continuous sidewall 137. Further, the body 131 may also include a root 134 for coupling the blade assembly 114 to the rotor 13. The body 131 may include a channel 161 that surrounds the cavity 135.

Turning to the inner and outer covers 141, 142, the inner cover 141 may include a groove 162 on its convex side 143. The inner cover 141 may also include a continuous side edge 147. In addition to the convex side 143, the inner cover 141 may also include a concave side 144 (FIG. 6). Similarly, the outer cover 142 may include a convex side 145, a continuous side edge 148 and a concave side 146 (FIG. 6).

Turning to FIG. 5, the inner cover 141 may include a continuous straddle 163 on its concave side 144 that is in matching registry with the groove 162 on the convex side 143. The straddle 163 may be received in the channel 161 on the convex side 132 of the body 133. When the straddle 163 may be received in the channel 161, the concave side 144 of the inner cover 141 is spaced apart from the back wall 136 of the cavity 135. Further, the side edge 147 of the inner cover 141 may be received in the recess 165 that surrounds the channel 161. Thus, adhesive may be applied in the channel 161 and in the recess 165 to adhere the inner cover 141 to the body 131 of the fan assembly 114. In addition, adhesive may be applied in the groove 162 on the convex side 143 of the inner cover 141 and additional adhesive may be applied to the convex side 143 of the inner cover 141 to adhere the concave side 146 of the outer cover 142 to the inner cover 141.

Finally, more than two covers 41, 42 or 141, 142 may be employed. For example, a third outermost cover 71 and a fourth outermost cover 72 are shown in phantom in FIG. 2. Further, while titanium is one material that is suitable for use as the covers 41, 42 and 141, 142, other suitable materials will be apparent to those skilled in the art. Titanium is acceptable because of its strength, which enables the manufacturer to use relatively thin covers so as to provide a sufficiently large enough cavity 36, 136.

INDUSTRIAL APPLICABILITY

Fan blades are disclosed with cavities and more than one metal cover adhered to the blades. In one configuration, a fan blade includes multiple metal covers including an inner cover and an outer cover wherein the inner cover may have a feature to increase the adhesive area. The disclosed to fan blade assemblies provide adhesive between the inner cover and the blade body, adhesive between each cover, and more adhesive around the cover perimeters. The adhesive may then be sanded down to create a faired surface between the outermost cover and blade body.

With multiple titanium covers, a sufficient wall thickness may be obtained while the covers are still easily formable. Variations are attainable in the glue height that may allow the outer cover to be flush with the body, or at least allow the plurality of covers to have lower dams and waterfalls than a single cover of equivalent thickness because the autoclave process will cause any extra adhesive exit out through the cover perimeter. The plurality of covers of the disclosed embodiments may also provide more adhesive area. Further, hot forming of the individual titanium covers can be avoided if the covers are thin enough.

The invention claimed is:

1. A hollow fan blade comprising:
a body having a convex side and a concave side, the convex side having a cavity formed therein that is defined by a back wall and a continuous sidewall;
an inner cover at least partially overlaying the cavity and spaced apart from the back wall, the inner cover being adhered to the body;
an outer cover at least partially overlaying and abuttingly engaging the inner cover, the outer cover being adhered to at least one of the body or the inner cover, wherein the convex side of the body includes a channel disposed outside of the cavity and that surrounds the sidewall, the inner cover including a straddle disposed inside of a side edge of the inner cover, the straddle being received in and adhered to the channel of the body.

2. The fan blade of claim 1 wherein the continuous sidewall of the cavity is surrounded by a recess and the inner cover is adhered to the recess.

3. The fan blade of claim 2 wherein the recess is at least partially surrounded by a recess sidewall and the outer cover is adhered to the recess sidewall.

4. The fan blade of claim 3 further including a third outermost cover that is mateably received within the recess and that abuttingly engages the outer cover.

5. The fan blade of claim 4 wherein the third outermost cover includes a side edge that is adhered to at least one of the outer cover or the recess sidewall.

6. The fan blade of claim 4 wherein the third outermost cover includes a convex side that is at least substantially flush with the convex side of the body.

7. The fan blade of claim 1 wherein the outer cover has a concave side and the inner cover has a convex side that is adhered to the concave side of the outer cover.

8. The fan blade of claim 1 wherein the inner and outer covers are adhered to the body with at least one epoxy.

9. The fan blade of claim 1 wherein the outer cover includes a convex side that is at least substantially flush with the convex side of the body of the fan blade.

10. The fan blade of claim 1 wherein the inner cover includes a concave side and a convex side, the straddle extending from the concave side of the inner cover towards the channel in the body,
the convex side of the inner cover including a groove in registry with the straddle, the outer cover being adhered to the convex side of the inner cover.

11. The fan blade of claim 10 wherein the groove of the convex side of the inner cover includes adhesive for further adhering the outer cover to the inner cover.

12. The fan blade of claim 1 wherein the outer cover includes a side edge and the body includes a recess that surrounds the channel, the side edge of the outer cover being received in and adhered to the recess in the body.

13. The fan blade as in claim 1 wherein the continuous sidewall of the cavity is
surrounded by a recess, the recess being surrounded by a recess sidewall;
wherein the inner cover is mateably received in the recess and spaced apart from the back wall, the inner cover being adhered to the recess; and
wherein the outer cover is mateably received in the recess and abuttingly engages the inner cover, the outer cover being adhered to at least one of the inner cover or the recess sidewall.

14. The fan blade of claim 13 wherein the inner cover includes a convex side that abuttingly engages a concave side of the outer cover and that is adhered to the concave side of the outer cover.

15. The fan blade of claim 13 wherein the outer cover includes a convex side that is at least substantially flush with the convex side of the body of the fan blade.

16. The fan blade of claim 13 further including a third outermost cover that is mateably received within the recess and that abuttingly engages the outer cover, and wherein the third outermost cover includes a side edge that is adhered to the recess sidewall.

17. A hollow fan blade comprising:
- a body having a convex side and a concave side, the convex side having a cavity formed therein that is defined by a back wall surrounded by a continuous sidewall, the convex side of the body includes a continuous channel disposed outside of the cavity and that surrounds the sidewall;
- an inner cover at least partially overlaying the cavity and spaced apart from the back wall, the inner cover including a continuous side edge that is adhered to the body, the inner cover including a continuous straddle disposed inside of the continuous side edge of the inner cover, the straddle being received in and adhered to the channel of the body;
- an outer cover at least partially overlaying and abuttingly engaging the inner cover and being adhered to the inner cover.

18. The fan blade of claim 17 wherein the inner cover includes a concave side and a convex side, the straddle extending from the concave side of the inner cover towards the channel in the convex side of the body,
- the convex side of the inner cover including a continuous groove in registry with the straddle, the outer cover being adhered to the convex side of the inner cover,
- the convex side of the body further including a recess that surrounds the channel, the continuous side edge of the inner cover being received in and adhered to the recess.

19. The fan blade of claim 18 wherein the groove of the convex side of the inner cover includes adhesive for further adhering the outer cover to the inner cover.

* * * * *